(12) United States Patent
Baron et al.

(10) Patent No.: US 7,089,191 B2
(45) Date of Patent: Aug. 8, 2006

(54) SYSTEM AND METHOD FOR MANAGING INSURANCE OF VALUABLES HAVING UNPREDICTABLE FLUCTUATING VALUES

(75) Inventors: Yaron Baron, Shoham (IL); Rafi Nativ, Ra'anana (IL); David Engelmayer, Ra'anana (IL)

(73) Assignee: Silver Bell Finance Inc., St. Louis, MO (US)

( * ) Notice: Subject to any disclaimer, the term of this patent is extended or adjusted under 35 U.S.C. 154(b) by 567 days.

(21) Appl. No.: 10/323,712

(22) Filed: Dec. 18, 2002

(65) Prior Publication Data

US 2003/0144888 A1 Jul. 31, 2003

Related U.S. Application Data

(60) Provisional application No. 60/341,728, filed on Dec. 18, 2001.

(51) Int. Cl.
*G06Q 40/00* (2006.01)

(52) U.S. Cl. .............. 705/4; 705/37; 705/38; 705/35

(58) Field of Classification Search .......... 705/4, 705/35, 37, 36, 2, 39, 38, 40
See application file for complete search history.

(56) References Cited

U.S. PATENT DOCUMENTS

| 4,837,693 | A | * | 6/1989 | Schotz ................... 705/4 |
| 5,523,942 | A | * | 6/1996 | Tyler et al. ............. 705/4 |
| 5,754,980 | A | * | 5/1998 | Anderson et al. ....... 705/4 |
| 5,933,815 | A | * | 8/1999 | Golden .................. 705/35 |
| 6,018,714 | A | * | 1/2000 | Risen et al. ............ 705/4 |

FOREIGN PATENT DOCUMENTS

GB 2231420 A * 11/1990

OTHER PUBLICATIONS

FutureofIndividualDisabilityIncome, transcript.Session 7PD.Mod: Koopersmith. RECORD, vol. 23, No. 1. Palm Desert SpringMtg, Soc. of Actuaries. May 21-23, 1997. [Retr Jun. 30, 2003]Retrieved Internet.URL:<http://www.soa.org/library/record/1990-99/rsa97v23n17pd.pdf>.*

* cited by examiner

Primary Examiner—Joseph Thomas
Assistant Examiner—Natalie A. Pass
(74) Attorney, Agent, or Firm—Ladas and Parry LLP

(57) ABSTRACT

A method for insuring a stock option issued by an individual company from among a population of companies, to a beneficiary from among a population of beneficiaries, against loss of working ability of the beneficiary and consequent loss of the stock option, the stock option being vestable on at least one vesting date, the method including computing an economic risk factor characterizing the behavior of stock options in the population of companies and an actuarial risk factor characterizing the likelihood of loss of working ability in the population of beneficiaries and, on at least one vesting date, computing a premium based on the economic and actuarial risk factors and on the value of the shares on the vesting date.

6 Claims, 7 Drawing Sheets

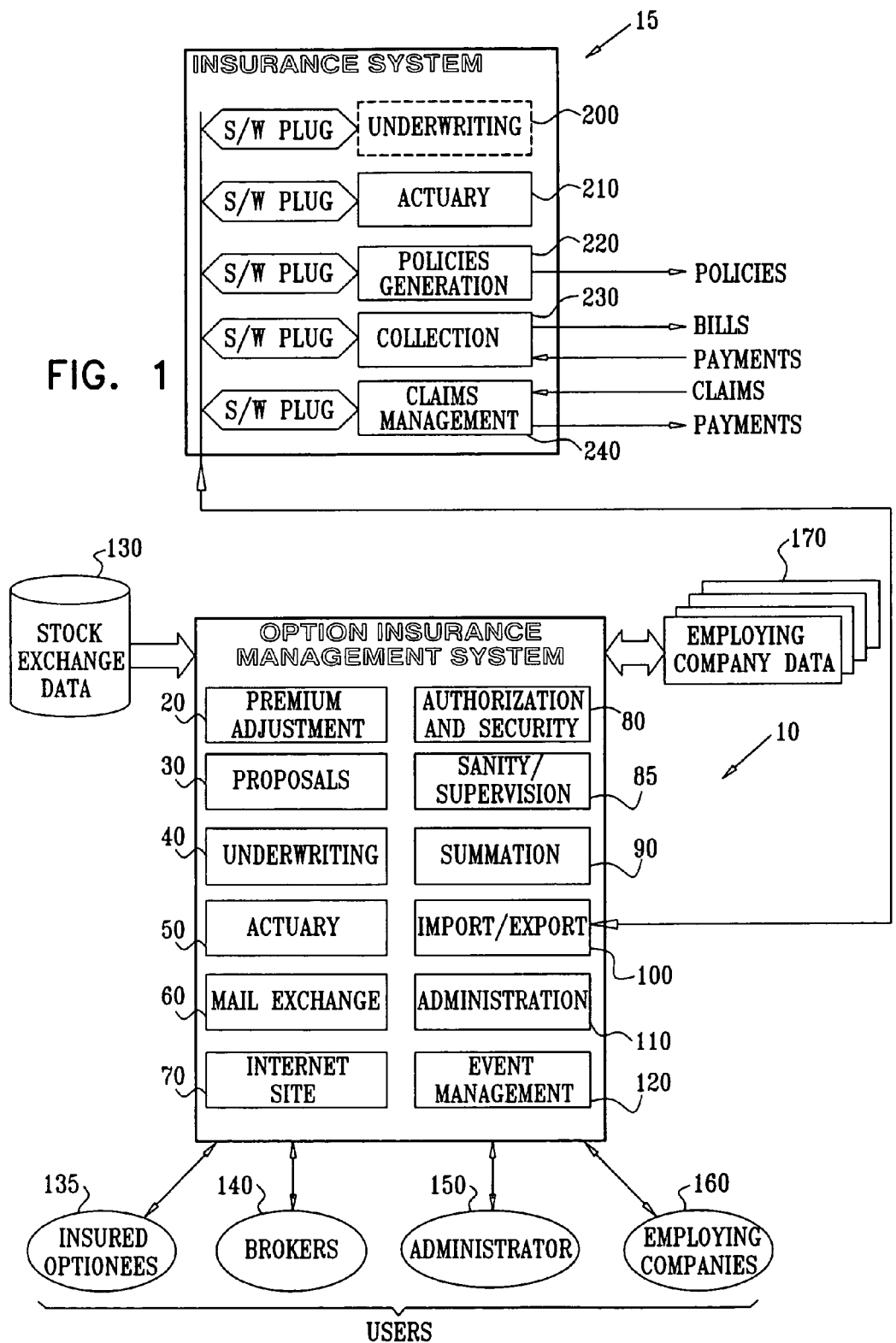

FIG. 3A

| | STARTING POINT | END OF 1st YEAR | END OF 2nd YEAR | END OF 3rd YEAR | END OF 4th YEAR | TOTAL |
|---|---|---|---|---|---|---|
| j (YEAR INDEX) | j=0 | j=1 | j=2 | j=3 | j=4 | |
| NUMBER OF VESTED OPTIONS ($NVO_j$) | 0 | 2500 | 2500 | 2500 | 2500 | |
| NUMBER OF UNVESTED OPTIONS ($NUO_j$) | 10000 | 7500 | 5000 | 2500 | 2500 | |
| AVERAGE MARKET VALUE PER SHARE ($MV_j$) | $25 | $28 | $23 | $25 | $30 | |
| THE INSURED BENEFIT ($MV_j - ST$) | $4 | $7 | $2 | $4 | $9 | |
| REDEMPTION SUM | $0 | $17500 | $5000 | $10000 | $22500 | $55000 |
| PREMIUM PAYMENTS WITHOUT ADVANCEMENT OF PAYMENT ($P_j$) | $0 | $70 | $40 | $120 | $360 | $590 |
| PREMIUM PAYMENTS WITH ADVANCEMENT OF PAYMENT ($PE_j$) | $160 | $120 | -$130 | $120 | $320 | $590 |

FIG. 4

| | FORMULA TABLE |
|---|---|
| I | $P_j = \sum_{i=0}^{j-1} PEi - SP_j + AP_j$ |
| II | $SP_j = \sum_{i=0}^{j-1} Pi$ |
| III | $NRP = \{\sum_{i=1}^{m} k_i * q_i\} / \{\sum_{i=1}^{m} k_i\}$ |
| IV | $NRP = \{\sum_{i=1}^{m} q_i * \sum_{j=1}^{k_i} SI_j\} / \{\sum_{i=1}^{m} \sum_{j=1}^{k_i} SI_j\}$ |
| V | $NRP = \dfrac{\sum_{T=1}^{L} \sum_{i=1}^{m} q_{i+T} * \{\sum_{j=1}^{k_i} Min(PPL - \sum_{t=1}^{T-1} n_{i,j,t} * Max[MV_t - X_i, 0],\ n_{i,j} * Max[MV_T - X_i, 0])\}}{\sum_{T=1}^{L} \sum_{i=1}^{m} \sum_{j=1}^{k_i} \{Min(PPL - \sum_{t=1}^{T-1} n_{i,j,t} * Max[MV_t - X_i, 0],\ n_{i,j} * Max[MV_T - X_i, 0])\}}$ |
| VI | $NRP = E[NRP] = \int_{-\infty}^{\infty} NRP(MV_t) * f(MV_t \mid NRP > 0) dMV_t$ |
| VII | $SD = Var(NRP)^{1/2} = [\{\int_{-\infty}^{\infty} NRP(MV_t)^2 * f(MV_t \mid NRP > 0) dMV_t\} - E[NRP]^2]^{1/2}$ |

FIG. 5

| DELTA | 20% | CURRENT STOCK PRICE | $20 |
|---|---|---|---|
| OLF | 98% | DISTRIBUTION | LOGNORMAL |
| c | 1.1 | MEAN | 9% |
| L | 1 | STDEV | 15% |

| GROUP | RATE | EMPLOYEES | INSURED SI | OPTIONS/ EMPLOYEE | STRIKE PRICE |
|---|---|---|---|---|---|
| i | $q_i$ | $k_i$ | SI | $n_i$ | $X_i$ |
| 1 | 2.0‰ | 300 | 100.000 | 100.000 | $20.00 |
| 2 | 3.0‰ | 200 | 150.000 | 150.000 | $18.00 |
| 3 | 4.0‰ | 100 | 250.000 | 250.000 | $16.00 |
| 4 | 5.0‰ | 15 | 500.000 | 500.000 | $12.00 |

| EXAMPLE | (1) | (2) | (3) | (4) |
|---|---|---|---|---|
| STRIKE PRICE | N/A | N/A | $15 | VARIES($X_i$) |
| NRP/E[NRP] | 2.724‰ | 3.108‰ | 3.235‰ | 3.897‰ |
| SD | N/A | N/A | 0.000‰ | 0.396‰ |
| $RF_S$ | 3.268‰ | 3.730‰ | 3.882‰ | 4.677‰ |
| $RF_O$ | 0.000‰ | 0.000‰ | (0.065‰) | 0.358‰ |
| RF | 3.268‰ | 3.730‰ | 3.818‰ | 5.034‰ |

| WITH PPL OF $100.000 EXAMPLE | (5) | (6) |
|---|---|---|
| E[NRP] | 3.057‰ | 3.599‰ |
| SD | 0.107‰ | 0.473‰ |
| $RF_S$ | 3.668‰ | 4.319‰ |
| $RF_O$ | 0.056‰ | 0.448‰ |
| RF | 3.724‰ | 4.767‰ |

SYSTEM AND METHOD FOR MANAGING INSURANCE OF VALUABLES HAVING UNPREDICTABLE FLUCTUATING VALUES

This application claims the benefit of U.S. Provisional Application No.: APPLICATION NO.: 60/341,728 FILING DATE DEC. 18. 2001 and incorporates the same by reference.

FIELD OF THE INVENTION

The present invention relates to apparatus and methods for computing and managing insurance.

BACKGROUND OF THE INVENTION

Many types of insurance are known, typically falling under the categories of either life insurance, disability insurance or property insurance. Insuring all these categories is based on predefined insurance sum and predefined premium payments, maybe linked to some market values such as inflation or index rates. In all these categories if the insurance event occurs the entire insured sum is paid close to the event.

SUMMARY OF THE INVENTION

The present invention seeks to provide a system for insuring employees' benefit from stock options granted by employer, in case of occurrence of an insurance event such as death or long-term disability and methods for computing premium and insurance sum parameters.

Typically, employees are only entitled to their unvested options as long as the company employs them. Once they leave the company they are no longer entitled to their unvested options and those options return to the company's pool of options. This is also the case if an employee passes away or is forced to leave the company because of long-term disability. According to a preferred embodiment of the present invention, an insurance company offers employees an option insurance policy that secures the employee's unvested options in case the employee becomes disabled or dies before the end of the vesting period. The insured employee typically enjoys: (a) full indemnity for increasing value of the good; and (b) premium payments directly linked to the market value of the company's share which implies premium payments only if the share value is above the option's strike price.

There is thus provided in accordance with a preferred embodiment of the present invention a method for insuring valuables or goods having unpredictable fluctuating values against an insurance event, the method including preselecting, for each of a plurality of insurance policies, each insuring valuables having an unpredictable fluctuating value on behalf of a beneficiary, against the insurance event, in return for payment of a premium by a predetermined paying entity, at least one future date at which at least a predefined portion of the value of the valuables is to be computed, predetermining a formula for computation of a premium as a function of the value of the valuables as computed on the at least one future date; and on the at least one future date, computing the predefined portion of the value of the commodity or valuables and, if the insurance event occurred, remitting the value to the beneficiary, and on the at least one future date, if the insurance event did not occur, computing the premium using the formula and debiting the premium to the paying entity.

Further in accordance with a preferred embodiment of the present invention, the step of debiting the premium to the paying entity includes collecting an advance payment before the future date; and, on the at least one future date, subtracting the advance payment from the premium and debiting the resulting sum, if positive, to the paying entity.

Further in accordance with a preferred embodiment of the present invention, the method also includes crediting the resulting sum, if negative, to the paying entity.

Also provided, in accordance with another preferred embodiment of the present invention, is a method for insuring a stock option issued by an individual company from among a population of companies, to a beneficiary from among a population of beneficiaries, against loss of working ability of the beneficiary and consequent loss of the stock option, the stock option being vestable on at least one vesting date, the method including computing an economic risk factor based on a model of the behavior of stock options in a population of companies and an actuarial risk factor based on a suitable, typically conventional, actuarial model of loss of working ability in the population of beneficiaries, and on at least one vesting date, computing a premium based on both risk factors and on the value of the stock option on the vesting date.

The commodity or valuables may comprise a stock option defining a plurality of vesting dates and a plurality of stock amounts associated therewith and the preselecting step may comprise preselecting each vesting date as a future date and defining the stock amount associated with each vesting date as the predefined portion of the value of the commodity or valuables to be computed on that future date.

One embodiment of the present invention seeks to provide a premium computation method and a software system for implementation thereof. Preferably computation of premiums is linked to the ever changing, unpredictable value of the insured goods. The software system typically imports market values, initiates a premium computation method, manages related data bases and generates reports to all users in an insuring chain.

Another embodiment of the present invention seeks to provide a system for managing an options insurance policy for employees having unvested options, who may become disabled or pass away before the end of their vesting period. In such a case the insurance company typically pays the insurant or beneficiary, at each vesting date, the exact or mean market value of the options.

The premium may be computed in accordance with a formula such as:

$$Pj=(MVj-ST)*RF*NVOj*j, \text{ where:}$$

Pj—Premium to be paid in year j
MVj—Market Value of the share (valuable) at year j
ST—Strike Price of option granted to the employee
RF—Tariff, also known as cost of insurance or risk factor, typically a combination of an actuarial risk factor and an economic risk factor.
NVOj—Number of employee's vested Options at year j
j—Years elapsed from policy initiation The tariff or cost of insurance is selected to ensure that, given statistical assumptions regarding a particular population of beneficiaries which affect the probability of occurrence of the insurance event, the insurance company will not lose from issuing the insurance policies.

In the present invention the risk factor (RF) typically contains two risk components: RFs denoting an actuarial risk factor and an economic risk factor (RFo) characterizing the shares and/or unvested options to ensure that, given economic assumptions which affect the population of expected values of the valuables being insured in the policies issued, the insurance company profits and does not lose from issuing the insurance policies.

The economic constant can be selected to be 1 if it is not desired to make any economic assumptions. Alternatively, the economic constant can be selected arbitrarily, without making any economic assumptions, on the basis of a desired level of risk-control. Alternatively, the economic constant can be selected on the basis of a feedback mechanism by which the pattern of profits and losses of the insurance company from previous years is learned in order to determine appropriate economic constants for the future. The economic constant or constants learned from past experience may or may not be based on parameters of the particular policy. For example, it may be learned by applying a feedback mechanism, that insuring high-tech stock options resulted in losses whereas tourism stock options resulted in profit. As a result, the economic constant for high-tech stock options may be increased whereas the economic constant for tourism stock options may be decreased.

The economic constant can also be selected on the basis of a priori economic assumptions, at least in order to estimate the histogram of expected values of the insured commodities or valuables and/or in order to estimate the expected variance in the values of the histogram of the expected values of the commodity or valuables, given unknown economic changes. For example, if stock options are being insured, an economic constant may be computed by learning the past behavior of stock options of the same general type, both currently and over an extended period of time in order to evaluate the extent of fluctuation thereof. A worst case analysis can also be conducted, e.g. an analysis of the behavior of stocks in the past before and during severe depression, in order to determine rules for identifying uninsurable situations.

Conventional insurance policies define an insurance sum and related premiums for the entire insurance period. The insurant signs on a policy based on pre-computed payments (premiums), and on precisely predictable indemnity sums and nothing except the inflation index factor typically changes in the course of the insurance period of that policy. In case of disability or decease the insurant is indemnified with the pre-defined insurance sum. The only unknown in the current existing insurance models is when the insurance sum is to become due.

The insurance model provided in accordance with one preferred embodiment of the present invention directly links the indemnified sum and the related premiums to the market value of the insured goods at pre-selected dates. Uncertainties in the indemnified sum, also known as the "insurance sum" or "redemption sum", and premium payments are adjusted along the insurance period in accordance with the market value of the insured goods thereby to insure goods with unpredicted floating values.

The insured party typically enjoys the following benefits: a) full indemnity for increasing value of the goods, b) premium payments directly linked to the market value of the goods which obviates premium overpayments.

Premiums for an insurance policy constructed and operative using the system of the present invention can be paid either by cash or by means of the insured goods or any combination thereof.

The values of traded companies are unpredicted and relates to market demand on stock exchange markets such as NASDAQ, NYSE, DOW and NIKKEI. In accordance with a preferred embodiment of the present invention, employee options are offered an insurance policy that secures the employee's unvested options. The premiums are floating and change along the insurance period according to the company's market value and if indemnity becomes due it is paid according to the market value. An options insurance policy issued by the system of the present invention typically secures the incomes from the unvested options in case the employee becomes disabled or passes away before the end of the vesting period. The system of the present invention preferably fully supports the insurance policies including computation of premiums and redemption sums, on behalf of the insurance company, according to the market value of his/her options at their vesting dates.

The insurance carrier typically provides the employee of a company with an insurance policy for his/her unvested options in accordance with the company's option plan. The insurance policy can be issued individually for each individual in the company, or as collective insurance policy for all employees entitled to options collectively. Initial payments such as registration and administration fees may be collected according to suitable arrangements between the parties. The employee's options are typically kept in escrow by a third party and are transferred to the employee if there is no debt to the insurer. Once the employee is forced to terminate his/her engagement with the company (disability or decease), the unvested options return to the company's stock options and the insurance policy is transferred to the insurant or his beneficiaries. From this point on the insurance carrier deals with the insurant and pays him/her, at the vesting dates, a sum which approximately equals the real market value of the options.

A particular advantage of a preferred embodiment of the present invention is that the insurant insures redemption of his options in case of force majeure, and is indemnified according to the actual market value of his options. Premium payments are adjusted to the market value such that the insurant does not overpay. Also, the employing company typically profits by keeping the unvested options in its stock while at the same time improving the wellbeing of its employees at little expense.

The premium payments for an insurance policy provided by the system of the present invention typically comprises two components: fixed payments paid initially and complementary payments to be paid on each vesting date of the options. The complementary payments are linked to the market value and behavior of the options along the insurance period. At each vesting date the premium for the next insurance period is either increased or reduced and the insurant or insurance company complements payments for the next vesting period. The proportion between the fixed and complementary portions is determined between the company and the insuring agent. Payments may be a combination of cash and employee's options. The system selects on a suitable combination according to a user's (insurance company's) preferences, based on the user's tradeoffs: immediate cash versus balancing options and potential revenues.

The premium computation method shown and described herein preferably absorbs parameters related to specific companies and almost on-line changing market values. Computations are preferably performed by at least two sub-modules, termed herein the Actuary and Adjustment modules. The Actuary Module is typically responsible for computing an insurance tariff which serves as a basis for the premium computation. Preferably, the actuary module takes into account per employee related information such as age, sex, smoker/non smoker, number of unvested options, strike price, tables of mortality and morbidity rates, and overall risk limiter such as per person limit and company overall limit, and projection of stock price parameters such as volatility of stock, risk free rate expected trends, dividend strategy of company etc.

The actuary module typically generates the insurance Tariff output which typically serves as input to the premium Adjustment module.

According to a preferred embodiment of the present invention, premium payments in option insurance programs generated by the Option Insuring System of the present invention typically are effected only if there is a benefit, e.g. if the market value of the company is higher than the Strike Price, whereas in conventional insurance systems, premium payments occur annually and unconditionally.

BRIEF DESCRIPTION OF THE DRAWINGS

The present invention will be understood and appreciated from the following detailed description, taken in conjunction with the drawings in which:

FIG. 1 is a simplified functional block diagram of an option insuring system constructed and operative in accordance with a preferred embodiment of the present invention;

FIG. 3A is a diagram illustrating premium computation, with and without advancement of payment, and redemption sums for an option insuring policy issued for the shares of FIG. 2A;

FIG. 4 is a formulae table presenting formulae which may be employed by the premium adjustment unit and/or by the actuary module of FIG. 1;

FIG. 5 is a table showing results of example computations based on formulae III through VII of FIG. 4, which may be performed by the actuary unit of FIG. 1.

DETAILED DESCRIPTION OF A PREFERRED EMBODIMENT

Figure 2A:
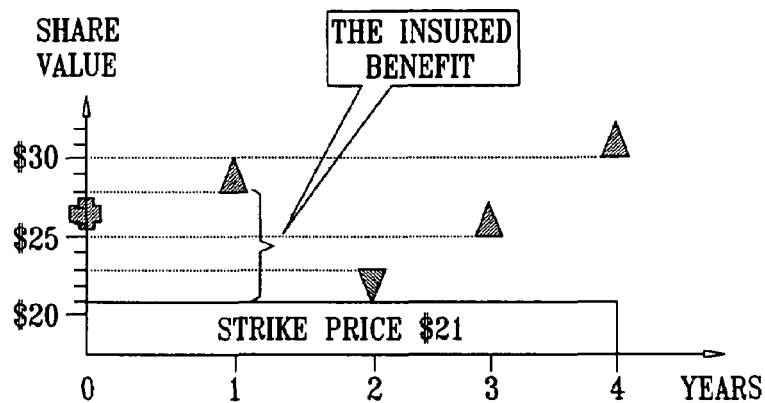
FIG. 2A is a diagram illustrating an example of the behavior of a share in the course of its vesting period.

FIG. 1 is a simplified functional block diagram of an options insuring system which generates option insurance policies in which the insured sum and premium payments are not defined in absolute numbers, and instead are linked to the market value of the insured goods. The option insurance policy typically insures the benefit of employee's unvested options in case of death or long-term disability. The options insuring system of FIG. 1 preferably provides relevant information such as information regarding option insuring policies, premiums, number of unvested options market values of shares etc., to the insurance carrier and to all parties involved, such as insured optionees 135, brokers 140, administrators 150 and employing companies 160, as shown, typically via the Internet and other state of the art information technologies.

The Option Insurance Management System (OIMS) 10 of FIG. 1 typically manages and control option insurance products, communicates with information providers involved in the options insurance environment, and provides optimized reports to each user in the insurance chain, typically including the insurance carrier, broker, employer and insured employee. The Option Insurance Management System 10 may be provided either as an ASP (Application Service Provider) enabling remote access to all the services, or may be installed at customer premises as an on-site server operated by the customer. Optionally, the OIMS is capable of operating both in ASP configuration and in a standalone configuration on insurance carrier's premises.

The OIMS 10 typically operates in an extremely dynamic environment, since insurance figures typically are constantly changing according to market fluctuations. Therefore, all management activities are preferably automated to reduce managing and control expenses. The OIMS 10 typically interacts automatically with the stock exchange markets to provide updated share values which may be stored in a stock exchange data repository 130. The OIMS 10 also typically interfaces automatically with companies' administration and finance offices to provide updated information on employed personnel, employee's stock options plan and vesting particulars.

Typically, an authorization and security module 80 provides selective access to information, e.g. as follows:

a. The insured employee may have access to his/her policy to obtain payment history and current value of his/her options. Optionally the insurance agent is able to display information related to other policies of that insurant.

b. The insurance broker is able to give companies all the services and information related to the insurance package they are offering, including information related to generating the policy, collection payments, option values and vesting status, and alerts and reminders on vesting dates for each employee.

c. Administrators are able to preset and redefine system conditions d. Each Company Executive is able to obtain various reports on company's stock options and insurance related information.

Figure 6:
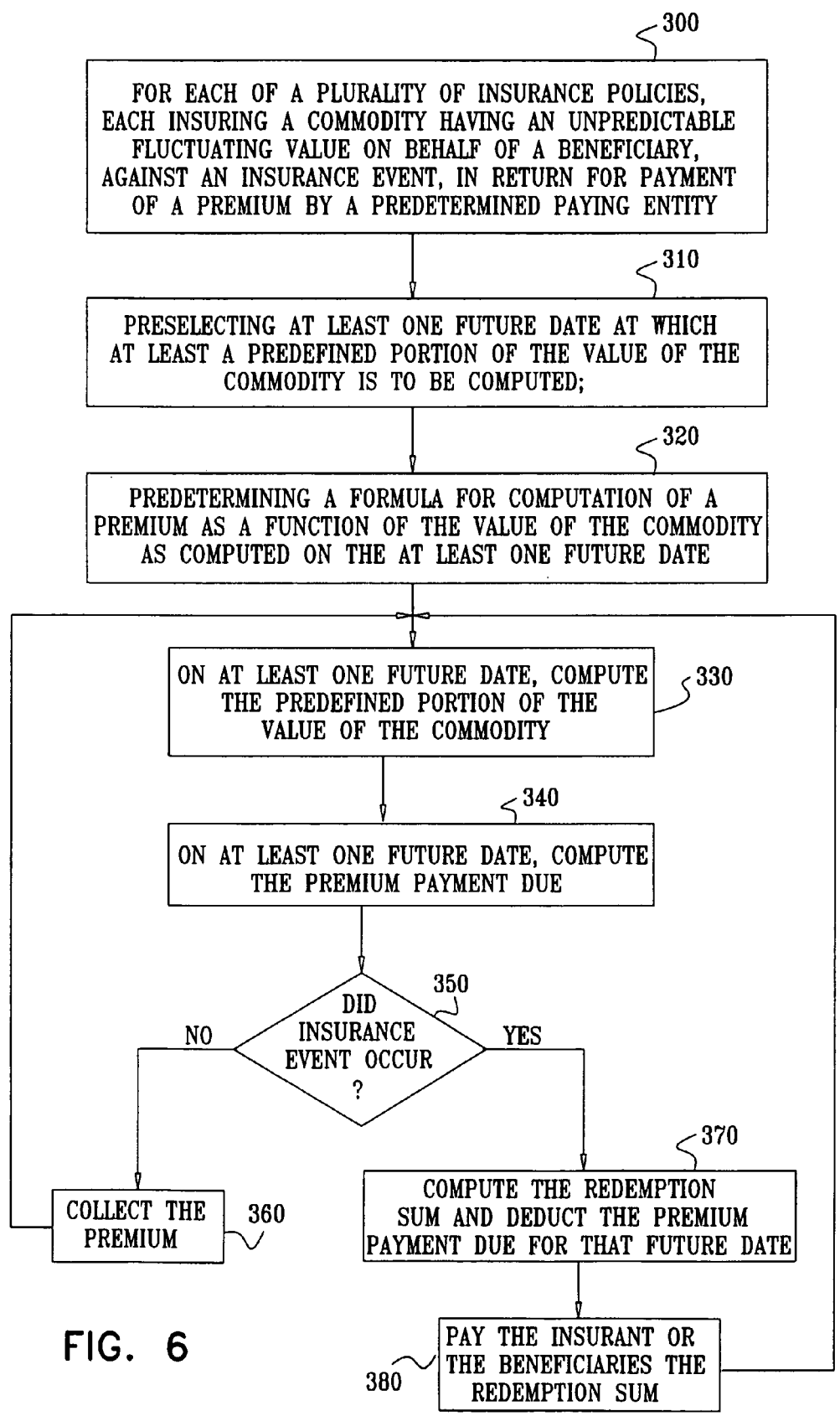
FIG. 6 is a simplified flowchart illustration of a method for insuring valuables having unpredictable fluctuating values against an insurance event, the method being operative in accordance with a preferred embodiment of the present invention.

The OIMS 10, as a platform enabling insurance carriers and brokers to sell and manage option insurance products, typically interfaces automatically with existing legacy insurance software systems 15 used by insurance carriers and brokers. The insurance system 15 may comprise the following functional units: an underwriting unit 200, an actuary unit 210, a policies generation unit 220, a collection unit 230 and a claims management unit 240. The OIMS 10 performs premium computations adjusted to the current value of the traded company e.g. as shown in FIG. 6. The trigger for premium computation can come, e.g. from authorized users or from an internal, pre-defined event (i.e. vesting date).

Preferred functional modules in the OIMS 10 are now described.

The Premium Adjustment Module 20: Computes insurance premiums at the end of each vesting year, or at any given time (up to daily resolution) as requested, e.g. as shown in FIG. 6. Also computes the Redemption Sum on each vesting date in case of claims. The payment is linked to the current value of the company's share. The module may compute several premiums linked to the same share value, for example life insurance, long-term disability and option insurance.

Input parameters to the premium adjustment module 20 may include: employee-employing company contract duration, % of payments, special discounts, market share value, strike price, one or more tariffs, average share value, premium already paid, years counter, number of vested options, number of unvested options. Output parameters generated by the premium adjustment module 20 may include: premiums, total premium paid, advanced payments received, and redemption sum. Generally, input parameters may be taken from a database 170 associated with each employing company.

The Contract Duration parameter may be provided by the employing company and defines the overall vesting period (usually 4 years).

The % of payment parameter may be provided by the insurance carrier and may be used for Redemption Sum computation in case of a claim. This parameter may allow an insured sum to be different from 100%, while the default is defined differently by each insurance carrier/broker.

A Special discount parameter may be provided by the insurance carrier, and may have a default value of 1.

The Market share value is extracted by the OIMS 10 from the stock exchange market as needed and may be stored in stock exchange data repository 130.

The Strike price is typically provided by the employing company.

Approved tariffs for each of a plurality of insurance products may be provided by the insurance carrier.

The Average Share Value parameter may be computed by the OIMS 10 by gathering the share values of a company within a specific period (typically with daily resolution) and multiplying by a factor defined in a later stage. The formula to compute the Average Share value may be modified by the insurance carrier.

A "Premium Already Paid" parameter may be provided by the OIMS 10 and used to compute the premium which remains to be paid.

A Years Counter may be maintained by the OIMS 10 to represent the current vesting year.

A "number of vested options" parameter may be maintained by the OIMS based on initial data provided by the employing company.

A "number of unvested options" may be provided by the OIMS based on initial data provided by the employing company.

A "number of employees participating in the option reward plan" parameter is applicable for group insurance plans in which a premium is computed for the entire company.

Output parameters may include several Premium parameters, each for a separate insurance product. The "Total Premium" output parameter is the total of all the premium parameters to be paid. The Redemption Sum is applicable in case of a claim due to death or disability and is the sum which is to be paid to the insurant at each vesting date.

The Underwriting module 40: Performs underwriting computations specifically for option insurance plans. Contains statistical information related to risk factors of a specific company for use by the Actuary module 50. For example, the following information may be provided per company and may be modified as necessary by the insurance carrier by means of the Administration module 110: Number of employees, number of employees having options, ages of employees, professions, employee turnover rate, company's payment reputation, company's economic strength, analysts' rating for company.

The Actuary Module 50: Performs actuarial computations specifically for option insurance plans. Responsible for providing insurance Tariff(s) related to a specific company. Typically provides the risk factor according to input data related to a specific company (or employee in case of individual insurance). Input data to the Actuary module 50 may include:

a. number of employees—number of employees in the company participating in the option reward plan
b. Employee related information such as age, sex, smoker/nonsmoker, number of options, strike price of options.
c. Insurer information such as table of mortality and morbidity rates, loading factor related to company size and risk factor related to option plan.
d. Risk management information including an insured limit per person and an overall claim limit.
e. Company market rating including information relating to volatility of stock, risk free rate, expected trends, and company's dividend strategy.
f. Average Age—the average age of the employees in the company participating in the option reward plan
g. Employee Turnover Rate—a number provided by the employing company.
h. Marketing Rating—a number typically available at market analysts or stock exchange market which is added as a factor to the tariff.
i. Special Parameter(s)—reserved input(s) for the insurance company; and
j. T1/T2—select the tariff value related to one of two (or more) insurance products.

Output Data generated by the actuary module 50 may include tariffs ("net risk of premium") for each of various insurance products.

Mail Exchange module 60: Responsible for exchanging emails among all the users, including emails initiated by a user and emails automatically triggered by the system.

Internet Site 70: Enables each user to access relevant information related to the option insurance activities. Each user is provided with relevant statistical figures and data. Each user of the system typically has a specific view of the system, provided by customizing the GUI (graphic user interface) of the system to the type of user. All system views are typically operated through a browser as Internet applications.

The following system views may be provided:
a. Optionee View—Used by the insured person to view the details of his policies, as well as general information regarding the insured goods.
b. Company Executives View—Used by executives in the financial department of a company insuring its employees.
c. Insurance Carrier View—Used by the users of the insurance company.
d. Brokers View—Used by brokers who sell insurance policies. This view typically contains a subset of the data in the Insurance company view.
e. Non-Customer View—Enables any non-customer to enter a home page promoting and explaining the option insurance concept benefits and providing computation examples. For example, a non-customer may be prompted to provide his company traded symbol, number of unvested options, vesting period, strike price, and estimated future share values and the system may compute and display to the non-customer present projected redemption sums and premiums.
f. Additional Views—for other types of users such as an investment bank, which is the trustee for the options allocated by the company.

Authorization and Security module 80: Enforces high security restrictions as applicable for financial systems used by banking systems. Typically, any access to the system, by any user, requires a login process, in which the user is required to enter a valid username and password only after a successful login, the user is allowed to access the system. All interaction with the system through the Internet is typically encoded, e.g. using Secure Socket Layer (SSL). The system typically contains a fire-wall.

The Authorization module is a layer that provides a callable interface. All system modules typically call the callable interface before performing any action as part of a user request. The calling application may specify the user, its type and the actions about to be performed. The Authorization module may return a Boolean answer specifying if the action is approved for the user or not. If yes, the calling module continues and the action is performed. If the action is not approved, the calling module may issue a warning message to the user and does not perform the operation.

Module 80 typically maintains a log of all its operations and saves it to a suitable storage medium. The saved data may be retrieved later in order to track actions performed by users. For example, messages about the following events may be written to the log: each action that was blocked by the authorization mechanism, each update made to the system data, each login (successful or unsuccessful), and internal problems identified in runtime.

An Import/export Module 100, also termed herein an "API" (application interface) may be used to import data from external sources to the system. The import module typically comprises a set of access modules, each customized for a certain data source. The imported data may be used for various system tasks. The import module may, for example, retrieve information from:
a. Software packages used to maintain data about employees
b. Software packages maintaining data about company stock options, the policy of stock options allocation to employees, and the amount of options allocated to employees.
c. Data from the insurance carrier/broker
e. General sources for financial data.

The export module may be used to export data to external sources. The export module typically comprises a set of access modules, each customized for a certain data target. The export module typically stores data in systems such as external software packages or databases of external systems.

Typically, all interactions of the OIMS 10 with external data sources is through the import and export module 100. Thereby, in order to add a new source to the system, the only components, which need be modified, are the import module and the export module.

Summation Module 90: For group insurance, the employing company might have several group insurances, and needs premium collection to be summarized for administrative reasons. The summation module performs the summation of all payments related to the employing company.

Administration Module 110: Typically comprises at least some of the following administration submodules, all web based, each with a different purpose and task: a setup administration submodule, an insurance company administration submodule, an employing company administration submodule, an insurance broker administration submodule, and a statistical report generating submodule.

The Setup Administration Submodule may be used to customize installation and use for a new insurance company. This module may tailor new installations and may customize the runtime system to best fit the needs of the customer. This module may perform the following tasks:
a. Customize the look and feel of the application in all its views, e.g. by rearranging pages, modifying part of the flow, and adding menu options. GUI elements may be provided to customize the application.
b. Define the applicable types of users, and customize the look and feel of the GUI for them.
c. Define the authorizations of each type of user. For each type of user, a set of authorization rules may be defined delimiting what the user is allowed to do at any point in the application flow.

Insurance Company Administration Submodule: may be used by insurance carriers for tasks such as defining types of goods that may be insured, along with their characteristics, defining types of policies and their characteristics, defining companies and contracts, defining various parameters related to the policies issued, defining the statistical figures to be provided, maintaining an authorization list and maintaining distribution list(s) related to system reminders.

Employing Company Administration Submodule: For administrative tasks preformed by employing companies, this module will provide functions such as updating information related to the option plan. This information may include dates, vesting period, number of options, and strike prices, and optionees' particulars such as names, ages, new optionees joining the insurance plan, and optionees leaving the company. This submodule is also operative to modify points of contact and update an authorization list.

Insurance Broker Administration Submodule: Performs similar maintainability functions as the insurance carrier.

Statistical report generating submodule: Presents data retrieved from the database by means of predefined reports, forms, and graphical charts.

Event Manager 120: Manages all the events and reminders in the system, triggers and initiates pre-defined procedures. Each reminder typically has a counter for predefined repeating reminders. Each reminder and repeating reminder typically has its own mailing list for alerting predefined individuals. The following are examples of suitable system reminders and events:
a. Vesting Date—triggers all procedures related to the vesting dates such as premium computation e.g. in accordance with the method of FIG. 6.
b. End of Vesting Period—similar to Vesting Date Reminder, but might have some more procedures.
c. Adjustment Frequency—causes an adjustment computation process in case adjustment frequency is higher than once a year.
d. Claim Payment Date—triggers all procedures related to the claim payment dates such as payment computation.
e. Insurance Approval Reminder—sent to the insurance authority reminding him to approve the Insurant Details form containing all the insurance details.
e. Renew Policy Reminder—sent to the insurance broker prompting him to contact the employing company.
f. Marketing Proposal Reminder—sent to the marketing authority regarding redemption sum available to the insurant.
g. Resolve Request—generated and sent in case of conflict with the Sanity module 85.
h. Resolve Reminder—shall be sent after a predefined period of time if no response was received to the Resolve Request.

Sanity/Supervision Module 85: Since most computations and activities are typically performed automatically, independent sanity checks are preferably performed. This module performs the independent sanity checks on premium computations, vesting dates, and/or claim payments. In case of conflict between the computed result and the sanity result a Resolve Request flag may be generated and mailed to a predefined authority. The sanity check is performed differently than the computation being checked. A sanity check is also preferably performed on all input data.

Proposal Module 30: Prior to preparing an insurance policy a proposal is prepared and negotiated with the customer. This module typically contains a predefined form with all data fields to be filled in. Once all data related to the customer (employing company) has been entered, the module may use a predefined proposal form containing information including preview simulation for payments along the vesting period.

The interface with existing insurance systems 15 is preferably via the import/export module 100 that accepts several formats for easily interfacing with legacy systems as well as common communication and descriptive formats (XML). Typically, interfacing occurs via software plugs in the insurance software systems 15. Typically, the insuring party continues, via its insurance software system 15, with their current working methods, including generating insurance policies, responsibility for bills, payment collection, and claim handling. The OIMS 10 provides computation based on company's stored data and market share value. The OIMS 10 also manages the events associated with the dynamically changing environment and, at every vesting date, computes the premium for each policy e.g. using the method of FIG. 6 and sends the collection figures, in predefined format, to pre-defined address(es).

Preferred insurance modes, provided in accordance with a preferred embodiment of the present invention, are now described.

An insurance process may comprise the following logical phases:

a. Proposing Phase—beginning with feeding data related to the employing company considering purchasing the option insurance and concluding with the approval of the Insurant Details form by the insurance authorities. The insurance proposal may be provided via the OIMS 10, or through an insurance broker 150, or both.

b. Insurance Starting Point—beginning after approval of the insurance policy details and concluding after providing the agreed-upon initial payments, typically including Administration/Registration fees and down payment. In this phase the event manager 120 is triggered with events and an associated activities list.

c. On-going Insurance Phase—beginning with the first event trigger related to the insurance policy (vesting date). For each vesting date, initiated by the event manager, computations are preferably performed automatically.

A Mean Share Value computation process may be initiated at every vesting date. It may download the daily traded share values for the past year, or for any defined period, and compute the mean value according to the formula approved by the insurance carrier.

A Financial Information Search process may search, at pre-defined intervals, or upon request, for analysts' rating and other commercial figures related to each, or to a particular, insuring company. The rating figures may be used to generate a company strength coefficient, which may in turn be used to generate an insurance tariff for the company's insurance products.

Preferred methods of computation which may be employed by the premium adjustment module 20 of FIG. 1 are now described. It is appreciated that the computation methods specifically described herein are merely exemplary of premium computation methods which are suitable for use in conjunction with the option insuring system of the present invention.

According to a preferred embodiment of the present invention, premiums are computed at the end of each vesting period and are related to the option portion released to the employee. As shown in FIG. 2B, the premium without any advanced payments may be computed according to the following formula:

$$Pj = (VMj - ST) * RF * NVOj * j, \text{ where:}$$

$Pj$=Premium to be paid in year j
$VMj$=Market Value of the share at year j
$ST$=Strike Price of options granted to the employee
$RF$=Tariff, also known as cost of insurance or risk factor
$NVOj$=Number of employee's vested Options at year j
$j$=Years elapsed from policy initiation A first example of how a premium and a redemption sum may be computed by the premium adjustment unit 20 is now described. The assumptions of the example include:

1) Tariff is 0.4% from the insurance sum;
2) Number of unvested options of employee at the insuring starting point is 10,000;
3) Vesting period is 4 years; each year 2,500 options are transferred to the employee
4) Option Strike Price per option is $21.

Figure 2B:
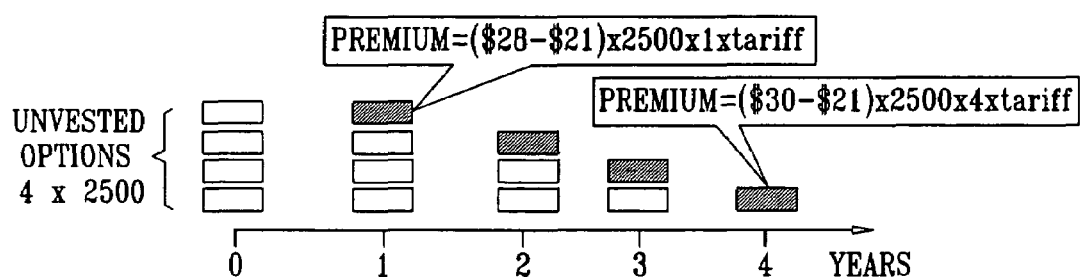
FIG. 2B is a diagram illustrating computation of premiums for the shares of FIG. 2A, according to a first preferred embodiment of the present invention.

FIGS. 2A–2B are diagrams illustrating an options insurance policy which may be issued by the system of the present invention, including an insured benefit and related premiums along the four vesting years. FIG. 2A illustrates the company's share behavior. The share price is $25 at the starting point of the insurance period, increases to $28 at the end of the first year, decreases to $23 at the end of the second year and increases to $30 at the end of the fourth year. The insured sum is defined as the difference between the current market value of the share, less the strike price, which is $21 in this example.

The table of FIG. 3A shows Redemption Sums an insurant may enjoy and the associated premium payments due to the insurance company. A preferred method for computing the redemption sum at year j is by use of the formula:

$$NVO_j \times (MV_j - ST) \times RF \times IL, \text{ where}$$

$NVO_j$=number of vested options at year j;
$MV_j$=market value of the stocks at year j;
$ST$=strike price;
$RF$=tariff or "cost of insurance", which typically comprises at least one risk factor(s); and
$IL$=insured limiting factor which may be 1 or some fraction of 1 such as 0.9.

The premium payment each year can be collected with or without advancing payment. The last row in table of FIG. 3A presents premium payments (PEj) when payment is advanced. Since in principle premium payments are due at the end of each insured year, insurance companies may collect advanced payment, to be adjusted at the end of each year.

The premium assuming advancement of payment is computed by the premium Adjustment module 20 which, at each vesting date, adjusts the premium according to the current share value, amount of unvested options and advanced payments already collected. According to the output of the Adjustment module 20, the insurant will be credited or debited.

The premium with advanced payment may be computed in accordance with formula I in the table of FIG. 4, where:
$Pj$=Premium, including advanced payment to be paid in year j APj=Advanced payment for year j+1 to be paid on year j
SPj=Sum already paid for insurance initiating date until year j
PEj=Premium that should be paid on year j if no advanced payment is made.

The sum already paid, SPj, may be computed in accordance with Formula II in the table of FIG. 4.

The Advanced Payment (AP) may be computed in accordance with the following formula:

$$Apj=NUOj* (MVj-ST)*RF$$

where:
MVj—Market Value of the Share on year j
NUOj—Number of employee's Unvested Options on year j
RF—The Tariff
ST—Strike Price of Options granted to the employee The Premium for Elapsed years (PE) may be computed in accordance with the following formula:

$$PEj=(NUOj-1-NUOj)*(MVj-ST)*RF*j.$$

Figure 3B:
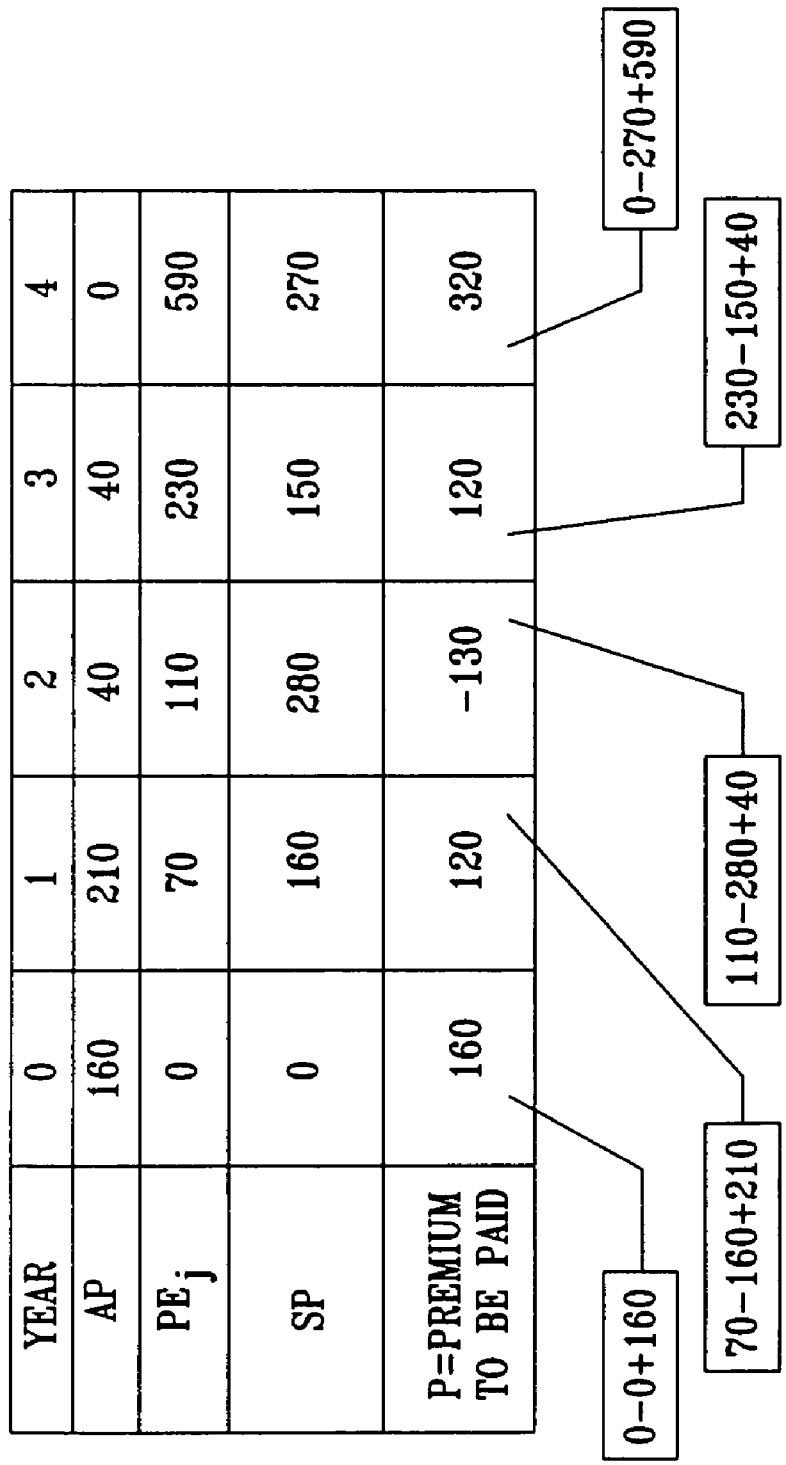
FIG. 3B is a diagram illustrating a preferred computation of premium payments with advancement of payment.

The table of FIG. 3B shows stages of computation of the results shown in the last row of FIG. 3A for PEj.

As shown in the "end of second year" column, bottom row, the insurant is credited (e.g. by $130) if the share value goes down and the insurant had paid too much in advance.

The Insured Benefit is computed as "Average Market value per share" less "Option Strike Price per Option" ($21 in this example).

The Redemption Sum is computed as "Average Market Value per Share" times the "Number of Vested Option" at the end of each year".

Level And Pattern Of Insurance Premium: An insurance premium can vary dramatically from year to year, even if the insured risk behaves as expected. The pricing concern for the insurance company is small premium amounts, which may not cover the company's fixed expenses and acquisition expenses. In an extreme scenario, an insurance product may never generate any premium because the strike price is above the market value or because the company dissolves. High employee turnover can contribute to small premium payments. The system of the present invention collects a predefined Administration fee in advance that is fixed and is renewed with each new policy or group of policies. In light of this, the sales force compensation should be structured.

The Insurance Premium payment mode can be either in cash or in options, and can be made either in advance or in arrears.

Cash versus Options payment of insurance premium:

If payment is made in the form of options, the insurer is typically alerted by the system of its responsibility to make sure that the options are exercisable and what restrictions exist that may create unwanted exposures. If the employee pays the premium, the options may be transferable.

Option based premiums may provide an additional profit margin because an option has a time value in addition to the intrinsic value. The system may take this into account and may cheapen the premium. The resulting discount may be at least partly countered by the fact that options are less liquid than cash.

Option based premiums may mean that the insurance company can acquire the stock of the company. For non-public companies, these options are generally without voting rights (frozen until initial public offering), which means that the value of these shares are less than the insurance benefit provided to the beneficiaries, which is the value of a voting share. This fact is preferably taken into account in increasing the adjustment factor.

Preferred methods for computing Tariffs are now described.

The Tariff may incorporate risk factors for life insurance, for long-term disability, for characterization of a specific population related to a specific company, and/or for the business parameters of each specific option-insuring company. The risk factor for life and long-term disability is typically based on statistically known mortality and morbidity rate factors that comprise the risk factor.

When insuring an optionee against loss of his/her option benefit in case of death or long-term disability, an additional new risk factor, based on economical considerations, is preferably employed if the product is handled as a collective insurance agreement. For individual insurance arrangements, where each insured is priced separately, a conventional insurance model may be applied using a conventional risk factor. Collective agreements, which utilize a single risk factor (RF) for all insurants may contain two risk components, a conventional actuary risk factor (RFs) and a risk factor related to the options (RFo). RF may be expressed as follows:

$$RF=RFs+RFo$$

For a conventional collective agreement, the uniform tariff may be computed as follows:

$$RFs=NRP*(1+DLT), \text{ where}$$

NRP=net risk premium, and
DLT=variability addition for potential shift in population distribution and size of insured population, where a smaller population typically requires a heavier load due to higher potential variability in claims. DLT is typically between 5% and 50%.

When a uniform sum is insured for all employees, formula III in FIG. 4 may be used as shown in Example 1 in FIG. 5.

For an insured sum that may differ by employee, formula IV in FIG. 4 may be used as shown in Example 2 in FIG. 5, where m=number of risk categories differentiating the risks by age, sex, health, etc.
qi=mortality and morbidity (long-term disability) rate for category i
ki=number of insureds in category i
SIj=sum insured for insured j out of ki insureds in category i An additional commercial risk factor (RFo) may be taken into account, reflecting the potential variability of results depending on the stock price-strike price difference on the vesting date. The overall tariff (RF) may be a sum of two risk components: a conventional risk factor RFs, as described above, and RFo.

RFo and NRP are examples of how to quantify additional risk:

$$RFo=SD \times c+NRP*[OLF-1]$$

The Net Risk Premium (NRP) may be computed according to the formula V in FIG. 4, where:
SD=standard deviation of NRP, with regard to the variability in distribution due to stock price volatility
c=insurance company selected factor depending on risk management, market competition, and other business considerations. For example, for standard normal distributions, if an insurer wants to be 95% certain to be able to satisfy claims, c would be set as 1.96. In the computation examples of FIG. 5, c was chosen to be 1.1.

OLF=overall claims limit factor. An insurance company may build a catastrophic limit into the contract providing that claims with regard to the particular insurance agreement can not exceed a certain amount (OL=overall limit). OLF would generally be a number between 0.95 and 1.00.

L=Number of vesting stations/dates

PPL=per person limit, which is the maximum insured sum provided to an individual employee. The formula V in FIG. 4 may assume that the limit applies on a cumulative basis for the issue of the option plan and is not reset on each vesting date. A reset of the PPL may require a more complex formula introducing in addition the stochastic element of how many individuals incur a claim at what point in time. Examples (5) and (6) in FIG. 5 show risk factors when the per person limit is taken to be $100,000.

$n_{ij}$=number of options owned by individual j out of ki insureds in category i $X_i$=strike price for category i. If the strike price is identical for all employees and no PPL is applied, the SD portion of the RFo may be 0, as may be appreciated by comparing Examples (3) and (4) in FIG. 5.

$MV_t$=projected stock price (or projected average stock price) for the vesting date t Since $MV_t$ is a stochastic parameter which varies over time, the NRP parameter, which is a function of $Mv_t$, i.e. $NRP(MV_t)$, may be computed using probability functions. If one were to assume that $MV_t$ has a probability density function $f(MV_t)$ and the conditional probability function for cases in which NRP is greater than zero ($MV_t$ for NRP>0), e.g. long-normally distributed with parameters for the mean and the standard deviation, then the expected NRP, E[NRP] may be computed according to formula VI of FIG. 4, where $NRP(MV_t)$ is computed with formula III in FIG. 4.

The standard deviation SD of NRP, with regard to the variability in distribution due to stock price volatility, may be computed using formula VII in FIG. 4.

For multiperiod evaluations, which apply to stock option plans which typically have a series of vesting dates, a Monte Carlo simulation may be run in order to generate the stock market price from which the value of NRP can be derived. A multitude of these runs enables the standard deviation (SD) of NRP, as well as the impact an overall limit (OLF) has, to be estimated.

The Monte Carlo simulation may provide the $MV_t$ values for formula V in FIG. 4 and may be based on economic and stock market parameters. For a public company, the classic stock option pricing parameters may be considered, such as volatility of the stock and sector, current risk free rate, and dividend strategy of the company. If the company has options that are traded on the market, one may use these options to arrive at the current implied volatility. Optionally, models may include analyst reports and forecasts for the company reflecting expected trends by allowing for growth factors and volatility to change over time.

In FIG. 5, example 1 relates to a collective insurance plan in which there is no variation in the sum insured. Example 2 relates to a collective insurance plan in which the sum insured varies by age. Example 3 relates to a collective insurance plan in which there is no variation in strike price and no per person limit. Example 4 relates to a collective insurance plan in which the strike price varies by age and there is no per person limit. Example 5 relates to a collective insurance plan in which there is no variation in strike price and there is a per person limit of $100,000. Example 6 relates to a collective insurance plan in which the strike price varies by age and there is a per person limit of $100,000.

To compute the risk factors RFs and RFo as shown in Examples 3 through 6 in FIG. 5, the following steps may be performed:

a. Compute E[NRP] according to formula VI using the NRP obtained from formula V in FIG. 4;

b. Compute SD using formula VII using the NRP value obtained from formula V;

c. Compute RFs using the above formula for RFs and the value for E[NRP] computed in step a;

d. Compute RFo using the above formula and the values of E[NRP] and SD;

e. Compute RF by adding the two risk factors RFs and RFo.

The NRP values in the examples of FIG. 5 were computed as follows:

For Example 1, using formula III of FIG. 4;

For Example 2, using formula IV of FIG. 4;

For Examples 3–5, using formulae V, VI and VII of FIG. 4, based on a lognormal distribution having a mean of 9.0% and a standard deviation of 15%.

It is appreciated that some of the variation is a commonly found socialization issue in any collective arrangement (age and sex distribution), while other elements are specific to the OIMS 10, such as impact of strike price and effective market value. Therefore, it may be desirable to implement the actuary module 40 and the premium adjustment module 20 as a single unit.

Due to the variability in potential claims relative to the insurance premium collected, the minimum population to be insured is preferably bigger than in a usual collective insurance agreement. This is due to the variability computed on the NRP, which has two additional variables: number of options per insured and the intrinsic value of the option as of the vesting date.

Limiting Per Person Sum Insured: A likely situation is one in which there are a few executive officers who hold a large number of shares creating a potential exposure to a single life, which exceeds the capacity of the insurer. Therefore, preferably a limit is imposed on the per person sum insured to an acceptable level (Per Person Limit: PPL). Any excess would preferably either be handled through reinsurance or be excluded.

Capacity issue: Preferably, the potential claim amount is limited in view of the risk that the value of these options can reach very large dimensions as has sometimes occurred in startup situations. It is preferable therefore to limit the insured amount to a per person sum insured that cannot be exceeded (PPL) by means of a limiter in the policy that is input into the Adjustment module 20 or/and to the claims management module 240 as an alarm trigger, verifying that the redemption sum per insurant is within a defined limit.

Catastrophe coverage: claim amounts may be highly correlated on three accounts:

a) Many employees are at the same time in the same location (work place, travel to and from work)

b) The executive employees are even more correlated as they spend more time together (including business trips, etc.)

c) The sum insured may be high for all insureds at the same, as it depends on the single value MV on the vesting date Therefore, it is preferable for the system to purchase an overall claims limit (OL) either by means of reinsurance or built into an option insurance contract with the employer. Depending on the company's situation, an overall claims limit factor (OLF<1) may be applied to the net risk premium. This OLF may be computed using actuarial formula for aggregate excess of loss computations in conjunction with a Monte Carlo simulation providing the option pricing impact.

There is an anti-selection potential which is preferably avoided by excluding the following situation from being covered: if a company lowers the strike price on a high executive shortly before his passing away or becoming disabled, there exists a concern that the company, which knows more about its employees than the insurer does, acted this way because it knew that a claim was about to come due. The system of the present invention may require qualification periods for pre-exiting conditions which may be defined as alert-triggering conditions to the Sanity and Supervision module 80.

Level And Pattern Of Insurance Premium: An insurance premium can vary dramatically from year to year, even if the insured risk behaves as expected. The pricing concern for the insurance company is small premium amounts, which may not cover the company's fixed expenses and acquisition expenses. In an extreme scenario the insurer may end up with a product that never generates any premium because the strike price is above the market value or the company dissolves. High employee turnover can contribute to small premium payments. The system of the present invention preferably collects a predefined Administration fee in advance that may be fixed and may be renewed with each new policy or group of policies.

The Insurance Premium payment mode can be either in cash or in options, and can be made either in advance or in arrears.

Cash versus Options payment of insurance premium:

If payment is made in the form of options, the insurer is typically alerted by the system of its responsibility to make sure that the options are exercisable and what restrictions exist that may create unwanted exposures. If the employee pays the premium, the options have to be transferable.

Options based premium provides an additional profit margin because an option has a time value in addition to the intrinsic value. The system may take this into account and cheapen the premium somewhat. The resulting discount may be at least partly countered by the fact that options are less liquid than cash.

Option based premium means that the insurance company can acquire the stock of the company. For non-public companies, these options will generally be without voting rights (frozen until IPO), which means that the value of these shares are inferior to the insurance benefit provided to the beneficiaries, which is the value of a voting share. This element is preferably taken into account in increasing the adjustment factor.

Advance Or In Arrears Payment of insurance premium:

Payment on the vesting date creates a near perfect matching of assets (premium) and liabilities (claims), if the pricing was correct. However, the disadvantage of this method is that payment may not be made by all insureds. Therefore, a security preferably has to be set up to ensure premium payment. If options can legally serve as security, there may be a delay risk from the vesting date to the exercise date, which can create an undesirable exposure for the insurance company. The adjustment factor is also affected by the identity of the entity who provides the security: the employee or the employer.

Advance payment typically has a reducing impact on the adjustment factor. The size of the reduction depends on the size of the advance payment and the accounting applied to it on the vesting date.

The number of vesting stations and period in between vesting stations typically affects the distribution of potential results in terms of the insurance company being hit with claims at a single point in time. The more stations there are, and the further apart they are, the less volatile are the expected results.

Liquidation Event: on the vesting date, preferably, open claims are settled to ensure premiums are back-to-back with the sum insured to be paid. Otherwise, a mismatch between current premiums being paid upon vesting and the eventual claims to be paid at later theoretical vesting dates can occur. If only a portion of the options are vested, then the system preferably ensures that enough options remain to justify the continuation of the insurance plan as explained above.

Swapping of options upon Merge and Acquisition: For open claims in which death occurred prior to vesting of options, options are preferably swapped along with other options that are swapped at the time in order to ensure back-to-back with premium payments. After the swap, the insurance premium and especially the adjustment factor are preferably repriced based on the new circumstances.

Due to accounting considerations, some option plans set the number of options, vesting dates and strike prices at the issue date of the options. If unique options become part of the Employee Stock Option Plan (ESOP), these parameters may be reflected in the adjustment factor in the Adjustment module 20, e.g. strike price for vesting date after next may depend on stock value in the future or be based on some average.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

The invention claimed is:

1. A method for insuring valuables having unpredictable fluctuating values against an insurance event, the method comprising:

for each of a plurality of insurance policies, each insuring valuables having an unpredictable fluctuating value on behalf of a beneficiary, against an insurance event, in return for payment of a premium by a predetermined paying entity:

preselecting at least one future date at which at least a predefined portion of the value of the valuables is to be computed using a programmed digital computer;

predetermining a formula for computation of a premium as a function of the value of the valuables as computed on said at least one future date; and on said at least one future date, computing, using a programmed digital computer, the predefined portion of the value of the valuables and, if the insurance event occurred, remitting said value to the beneficiary; and on said at least one future date, if the insurance event did not occur, computing, using a programmed digital computer, the premium using said formula and debiting said premium to said paying entity.

2. A method according to claim 1 wherein said step of debiting said premium to said paying entity comprises:

collecting an advance payment before said future date; and on said at least one future date, subtracting the advance payment from said premium and debiting the resulting sum, if positive, to said paying entity.

3. A method according to claim 2 and also comprising crediting the resulting sum, if negative, to said paying entity.

4. A method according to claim 1 wherein said valuables comprise stock options.

5. A method according to claim 1 wherein said valuables comprise a stock option defining a plurality of vesting dates and a plurality of stock amounts associated therewith and said preselecting step comprises preselecting each vesting date as a future date and defining the stock amount associated with each vesting date as the predefined portion of the value of the valuables to be computed on that future date.

6. A method for insuring a stock option issued by an individual company from among a population of companies, to a beneficiary from among a population of beneficiaries, against loss of working ability of the beneficiary and consequent loss of the stock option, the stock option being vestable on at least one vesting date, the method comprising:

computing, using a programmed digital computer, an economic risk factor characterizing the behavior of stock options in the population of companies and an actuarial risk factor characterizing the likelihood of loss of working ability in the population of beneficiaries; and on said at least one vesting date, computing, using a programmed digital computer, a premium based on the economic and actuarial risk factors and on the value of the shares on the vesting date.

\* \* \* \* \*